United States Patent [19]

Alexander

[11] Patent Number: 4,753,001

[45] Date of Patent: Jun. 28, 1988

[54] WIRE STRIPPING METHOD AND APPARATUS

[76] Inventor: Billy R. Alexander, 3708 N. Main, Fort Worth, Tex. 76106

[21] Appl. No.: 64,620

[22] Filed: Jun. 22, 1987

[51] Int. Cl.$^4$ .............................................. H02G 1/12
[52] U.S. Cl. ....................................... 29/825; 29/867; 81/9.51
[58] Field of Search ................... 29/825, 867; 81/9.51; 83/503, 885

[56] References Cited

U.S. PATENT DOCUMENTS

| | | | |
|---|---|---|---|
| 3,641,852 | 2/1972 | Terada | 81/9.51 X |
| 3,822,615 | 7/1974 | Reed | 81/9.51 |
| 4,187,745 | 2/1980 | Lambert | 81/9.51 |
| 4,199,854 | 4/1980 | Bitting et al. | 29/426.5 |
| 4,207,782 | 6/1980 | Farmer | 81/9.51 |
| 4,327,609 | 5/1982 | Resch | 81/9.51 |
| 4,339,967 | 7/1982 | Greenberg | 81/9.51 |
| 4,442,587 | 4/1984 | Shields et al. | 81/9.51 X |
| 4,699,027 | 10/1987 | Guyette et al. | 81/9.51 |

Primary Examiner—P. W. Echols
Assistant Examiner—Taylor J. Ross
Attorney, Agent, or Firm—James E. Bradley

[57] ABSTRACT

A coated wire with a metal core is inserted between two rollers, at least one of which has a plurality of circumferential cutting edges. The rollers are adjusted to firmly grasp the wire. The cutting edges of the first roller are axially staggered relative to the cutting edges of the second roller. The distance between the cutting edges of each roller increases along the length of each roller. The depths of the grooves between the cutting edges of each roller differs at selected sections of each roller relative to other sections in each roller, and the width of the grooves is adapted to be less than the diameter of the wire to be stripped. The rollers are rotated at different speeds and in opposite directions to advance the wire through the rollers, slice the coating or jacket, and remove it from the metal core.

11 Claims, 3 Drawing Sheets

WIRE STRIPPING METHOD AND APPARATUS

BACKGROUND OF THE INVENTION

1. Field of the Invention

This invention relates generally to a method and apparatus for stripping wire, and specifically to a method and apparatus for removing the protective or insulating coating from a wire of the type having a metal core encased in protective or insulating material.

2. Description of the Prior Art

Conductive and nonconductive metal wires are often encased in an insulating or protective material. This material either electrically insulates the wire, or protects the wire from mechanical abrasion.

The metal core often has considerable salvage value. However, the value of stripped wire greatly exceeds that of unstripped wire. For example, copper has a current market value of roughly 50 cents per pound stripped. Unstripped copper, on the other hand, has a current market value of roughly 10 to 20 cents per pound. Clearly, stripping the wire of the insulation or other protective coating adds value to salvage wire.

SUMMARY OF THE INVENTION

The present invention is a method and apparatus useful for removing protective or insulating coatings from a wire of the type having a metal core encased in insulation or protective coatings.

The apparatus includes a rigid frame having two end plates, which support two axially mounted rollers. At least one of the rollers has a plurality of circumferential grooves defining a plurality of circular cutting edges spaced apart less than the diameter of the encased wire. A means for adjusting the relative position of the first and second rollers is provided to grasp the wire between the rollers and urge the cutting edges to penetrate the insulation or coating. A means for axially rotating at least one of the rollers is provided to propel the wire through the apparatus, and slice and remove the protective coating or insulation from the metal core.

The method of removing electrical insulation from a wire comprises the steps of inserting the encased wire between the rollers. The position of the rollers relative to each other is adjusted to grasp the insulated wire between the rollers and urge at least one cutting edge to penetrate the insulation or coating. At least one of the rollers is rotated to advance the encased wire and cut the insulation or coating free of the metal core.

DESCRIPTION OF THE DRAWING

FIG. 5 is a further enlarged side view of part of the rollers of the apparatus of FIG. 1, with an encased wire shown between the cutting edges.

DESCRIPTION OF THE PREFERRED EMBODIMENT

Figure 1:
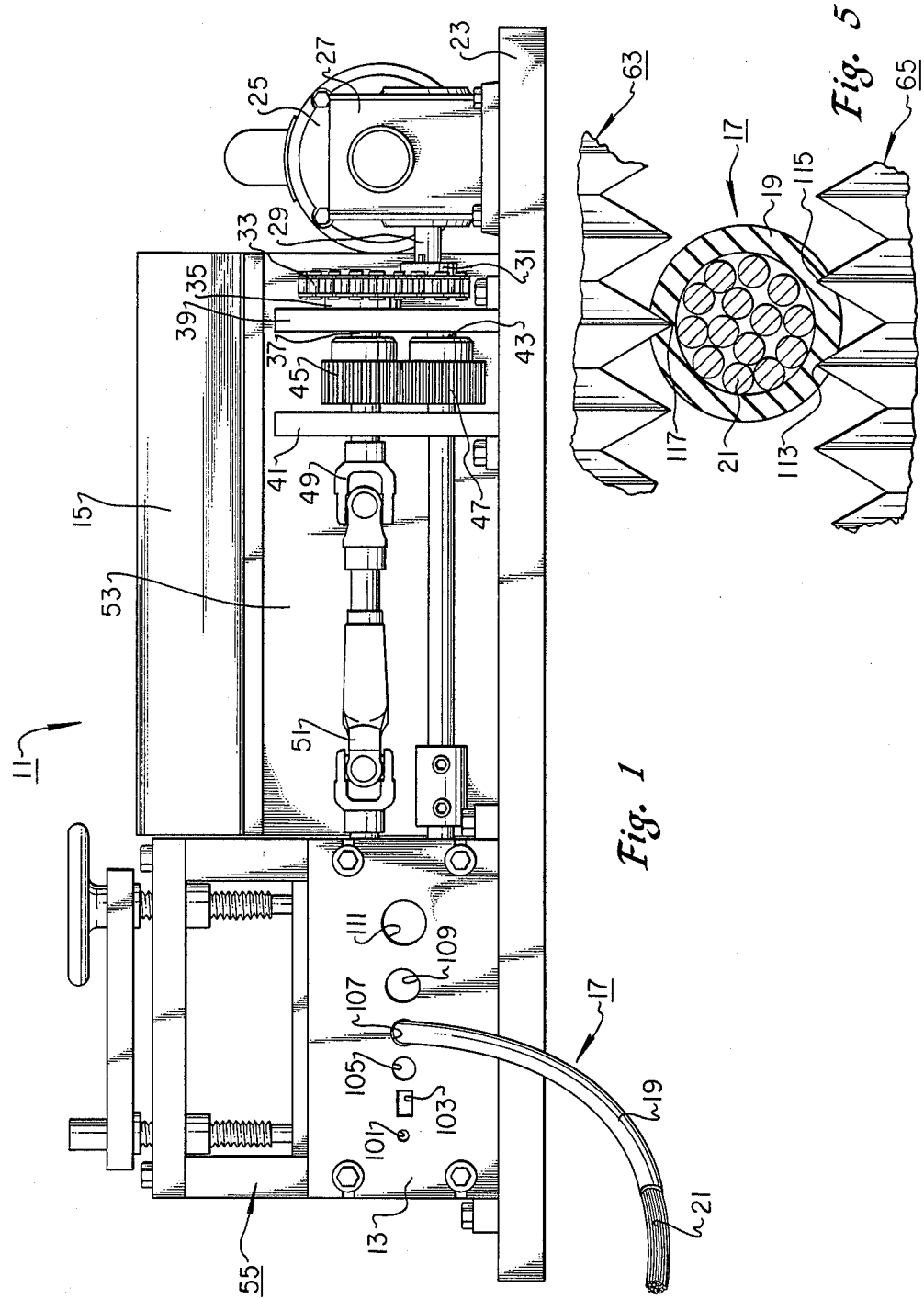
FIG. 1 is a front view of the wire stripping apparatus.

FIG. 1 is a front view of the wire stripping apparatus 11 with a protective cover and guide plate 13 in place, and a drive shaft housing door 15 raised.

Insulated wire 17 is shown feeding into guide plate 13. The figure illustrates that the insulated wire 17 is composed of a metal core 21 surrounded by insulating jacket 19.

A base plate 23 serves as a base for the apparatus 11. This base plate 23 may be disposed on the ground, on a work surface, or have legs attached to it. The components of the wire stripping apparatus 11 are bolted to this base plate 23.

Electric motor 25 is bolted to the base plate 23, and connected by motor shaft (not depicted) to gear reducer 27. In the preferred embodiment, the electric motor 25 is a 1 horsepower electric motor which operates at 1,725 revolutions per minute. The gear reducer 27 is a gear reducer which is designed to function at $\frac{3}{4}$ to 1 horsepower. This gear reducer 27 has a gear ratio of 30 to 1.

The gear reducer 27 drives a right angle shaft 29. Sprocket 31 is connected to the right angle shaft 29, and is linked to sprocket 35 by roller chain 33. In the preferred embodiment, sprocket 31 is a 60B12 sprocket, while sprocket 35 is a 60B18 sprocket. The roller chain is number 60 roller chain.

Sprocket 35 is connected to an upper drive shaft 37 which is supported by drive shaft plates 39, 41. Drive shaft plates 39, 41 are parallel to each other and bolted to the base plate 23. They have openings to accommodate upper drive shaft 37 and also a lower drive shaft 43, carried parallel to the upper drive shaft. Both upper and lower drive shafts 37, 43 rotate on double sealed ball bearings (not shown) carried by the openings in the end plates 39, 41.

An upper spur gear 45 is connected to the upper drive shaft 37 between drive shaft plates 39, 41. A lower spur gear 47 is connected to lower drive shaft 43 between drive shafts plate 39, 41. The upper spur gear 45 and the lower spur gear 47 are intermeshed. In the preferred embodiment, the upper spur gear is a S612 gear, and the lower spur gear is a S618 gear.

In this configuration, the lower drive shaft 43 is rotated at a slower rate, and in the opposite direction from, the upper drive shaft 37. In the preferred embodiment, the upper drive shaft 37 will rotate at 40 to 45 revolutions per minute, while the lower drive shaft will rotate at 30 to 35 revolutions per minute.

The lower drive shaft 43 is a fixed shaft. The upper drive shaft 37 is composed of a yoke drive shaft 49 coupled with a slip yoke drive shaft 51. In this configuration, the upper drive shaft 37 is vertically movable relative to the fixed lower drive shaft 43.

A drive shaft housing 53 is provided for safety; it encases sprockets 31, 35, roller chain 33, drive shaft plates 39, 41, upper spur gear 45, lower spur gear 47, upper drive shaft 37, and lower drive shaft 43. The drive shaft housing door 15 can to be raised as needed to allow access to the drive shafts and gears. FIG. 1 depicts this housing door 15 in a raised position.

The upper drive shaft 37 and lower drive shaft 43 serve to rotate an upper and lower rollers respectively (not depicted in FIG. 1). The upper and lower rollers are carried by frame 55 in FIG. 1. In this figure, the upper and lower rollers are obscured by protective cover and guide plate 13.

Figure 2:
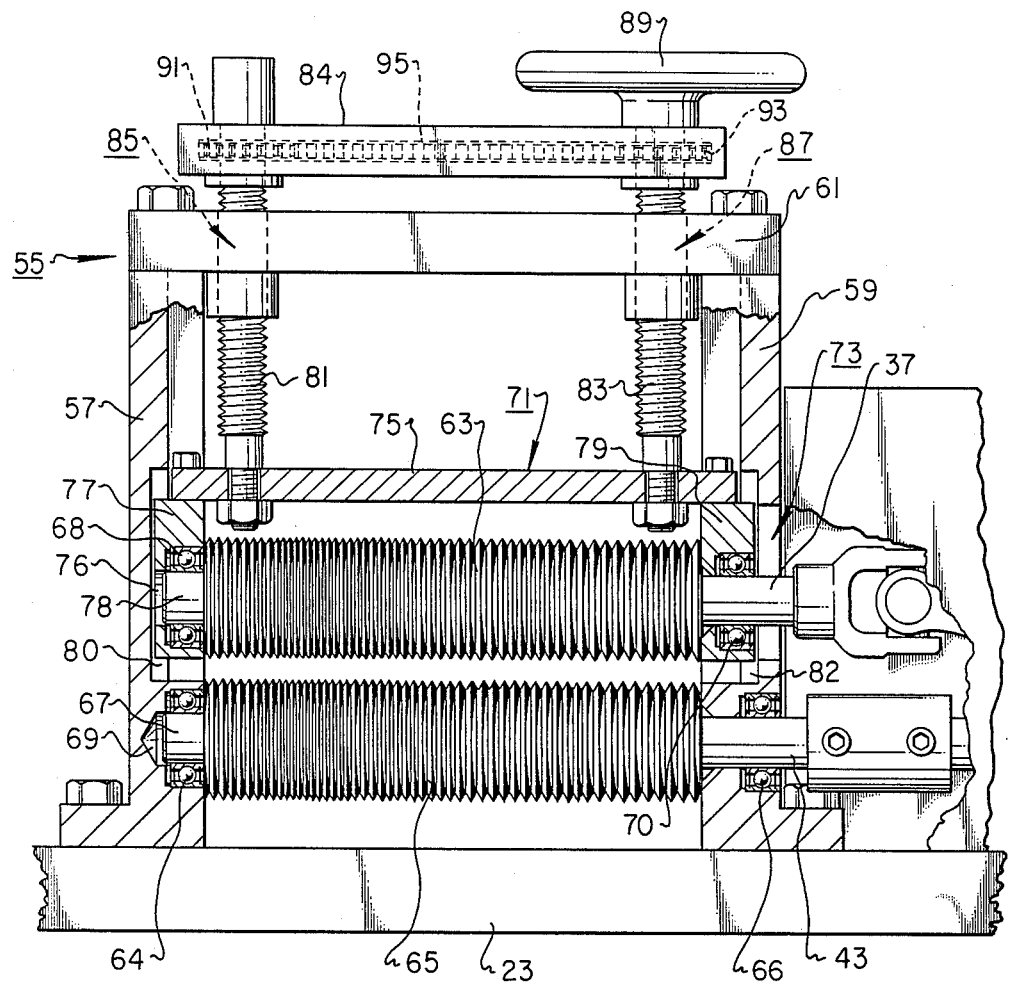
FIG. 2 is an partially sectioned view of the frame and roller assembly of the appratus of FIG. 1.

FIG. 2 depicts the frame and roller assembly in partial cut away view. The frame 55 is composed of end plates 57, 59, which are spaced apart, parallel, and bolted to the base plate 23, and a top plate 61 which is bolted to the upper edges of end plates 57, 59. When bolted together, the frame 55 is a rigid, rectangular structure.

Upper roller 63 and lower roller 65 are disposed between the end plates 57,59. In the preferred embodiment, each roller 63,65 has a plurality of parallel circumferential grooves that define a plurality of cutting edges.

The lower roller 65 is connected to lower drive shaft 43 through an opening in end plate 59. A roller peg 67 is provided on the opposite end of lower roller 65 and resides in a peg hole 69 which is formed in end plate 57. Peg 67 and lower drive shaft 43 are carried in the opening in end plate 59 and peg hole 76 by double sealed ball bearings 64, 66. In this configuration, lower roller 65 is allowed to rotate about its central axis between end plates 57,59 in response to torque from lower drive shaft 43.

The upper roller 63 is carried by an upper roller carriage 71. This upper roller carriage 71 is slidably retained by end plates 57,59. The entire carriage 71 can be raised and lowered relative to lower roller 65, which is fixed between end plates 57,59. Upper roller carriage 71 is composed of a top plate 75 and sliding end plates 77, 79. The sliding end plates 77,79 are spaced apart and parallel. The top plate 75 is bolted to the upper edges of the sliding end plates 77,79. When connected, the sliding end plates 77,79 and the top plate 75 form a rigid rectangular frame.

Upper roller 63 is mounted between the sliding end plates 77,79. Sliding end plate 77 has a peg hole 76 designed to accommodate a peg 78 of upper roller 63. The other sliding end plate 79 has an opening to receive the upper drive shaft 37. Peg 78 and upper drive shaft 37 are carried in peg hole 76 and the opening in sliding end plate 79 by double sealed ball bearings 68, 70. In this configuration, the upper roller 63 is free to rotate about its central axis in response to torque from the upper drive shaft 37.

The inner surfaces of the parallel end plates 57,59 have rectangular shaped cavities 80,82 that are designed to accommodate the sliding end plates 77,79. Cavity 80 in end plate 57 receives sliding end plate 77, while cavity 82 in end plate 59 receives sliding end plate 79.

A shaft opening 73 is provided in end plate 59, for upper drive shaft 37. This opening allows the upper drive shaft 37 to be raised and lowered in conjunction with the upper roller 63.

The top plate 75 of upper roller carriage 71 is bolted to two Acme screws 81,83. These Acme screws 81,83 are directed downward from top plate 61 of the frame 55 through threaded openings 85,87. Handle 89 is connected to Acme screw 83. Acme screw 81 has a sprocket 91 disposed above the top plate 61 of the frame 55. Likewise, Acme screw 83 has a sprocket 93 disposed above the top plate 61 of frame 55. A chain 95 connects sprocket 91 and sprocket 93.

The upper roller carriage 71 can be raised or lowered relative to lower roller 65 by operation of handle 89. The chain 95 connecting the sprocket 91 to sprocket 93 facilitates movement of the upper roller carriage 71. Chain guard 84 is provided for safety, and covers the sprockets 91,93 and chain 95.

Figure 3:
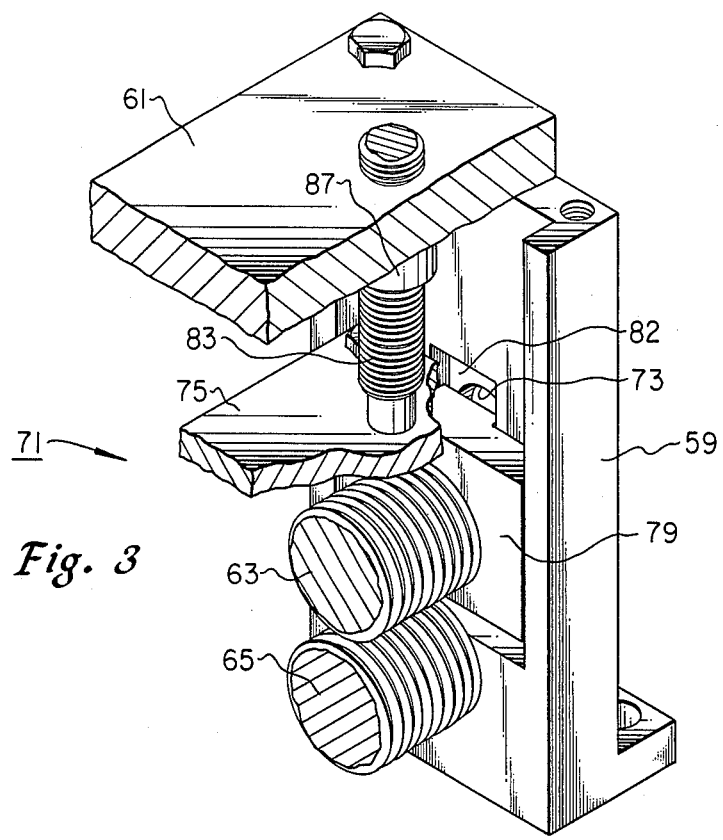
FIG. 3 is a perspective view of part of the frame and end plate assembly of the apparatus of FIG. 1.

FIG. 3 is a cut away view of the frame and end plate assembly. This view shows the configuration of the end plate 59 of the frame 55 and the sliding end plate 79 of the upper roller carriage 71. As the Acme screw 83 is advanced or retracted through threaded opening 89, the upper roller carriage 71 is raised or lowered.

The sliding end plate 79 interfaces with end plate 59, and slides upward and downward along end plate 59 within cavity 82. Opening 73 is provided through which upper drive shaft 37 (not shown) moves as the upper roller carriage 71 is raised or lowered relative to the lower roller 65.

Figure 4:
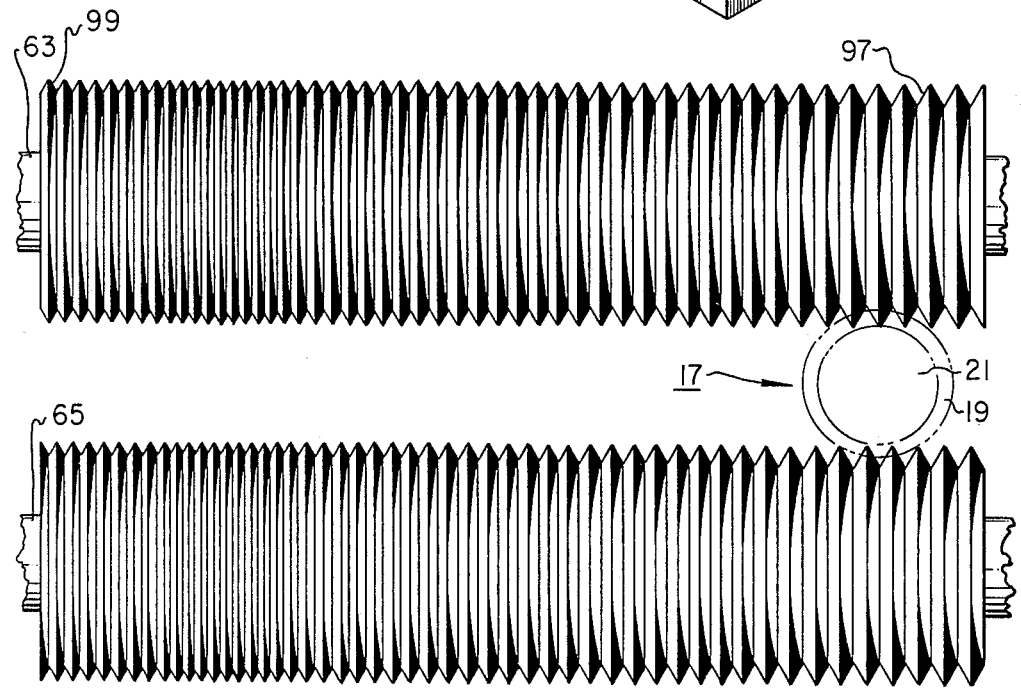
FIG. 4 is a side view of the rollers of the apparatus of FIG. 1, with an encased wire disposed between them.

FIG. 4 is a side view of the rollers with an insulated wire disposed between them. The upper roller 63 and lower roller 65 have a plurality of parallel circumferential grooves that define a plurality of cutting edges. The grooves are deeper and wider at the right end as shown in the drawing, forming a plurality of large cutting edges 97. At the opposite end of the upper and lower rollers 63,65, the grooves are narrower and shallower forming a plurality of small cutting edges 99. Six different sizes of cutting edges are provided on each roller including the large cutting edges 97 and the small cutting edges 99. The width and depth of the grooves increases in incremental sections from left to right.

The large cutting edges 97 are 0.300 inches from cutting edge peak to cutting edge peak. The groove between two cutting edges is 0.210 inches deep for the large cutting edges 97. The small cutting edges are 0.150 inches from cutting edge peak to cutting edge peak. The groove between the small cutting edges 99 is 0.100 inches deep. The four other size cutting edges, disposed between the small cutting edges 99 and the large cutting edges 97, have a variety of height and depth measurements to provide intermediate sized cutting edges.

As shown in FIG. 1, the protective cover and guide plate 13 has a plurality of openings 101, 103, 105, 107, 109, and 111. The plate 13 serves as a safety device which protects the operator from injury. The openings in this plate 13 serve to guide the wire through the wire stripping apparatus 11. Each opening serves to coordinate the insulated wire 17 size to the appropriate sized cutting edge. The large cutting edges are used to strip large diameter wires, while the small cutting edges are used to strip small diameter wires.

Opening 101 accommodates $\frac{3}{8}$ inch wire; opening 103 accommodates flat $\frac{5}{8}$ by 1 inch cable; opening 105 accommodates $\frac{3}{4}$ inch cable; opening 107 accommodates 1 inch cable; opening 109 accommodates $1\frac{1}{4}$ inch cable; opening 111 accommodates $1\frac{1}{2}$ inch cable.

FIG. 5 is a enlarged view of the insulated wire and cutting edges of the rollers. In the preferred embodiment, the upper rollers 63 and lower roller 65 are offset by one cutting edge; the cutting edges will intermesh if the two rollers were brought together.

In this figure, the insulated wire 17 is grasped by cutting edges 113 and 115 of the lower roller 65. Cutting edge 117 of the upper roller 63 grasps the upper portion of the insulated wire. The cutting edges 113, 115, 117 penetrate the insulation 19 of the insulated wire 17. As the rollers are rotated, the wire is propelled through the apparatus and the cutting edges slice the insulation 19 from the insulated wire 17.

In operation, the operator will raise the upper roller carriage 71 relative to the lower roller 65 by turning the handle 89. The upper roller carriage 71 is slidably retained by the end plates 57, 59. Then, the insulated wire 17 is inserted in the appropriate opening of cover plate 13.

Next, the operator lowers the upper roller carriage 71 to firmly grasp the insulated wire 17 between the upper roller 63 and the lower roller 65. The handle 89 is turned until the cutting edges of the rollers pierce the insulation 19 of the insulated wire 17.

The operator then turns on the electric motor 25. Motor 25 drives the right angle shaft 29 of gear reducer 27. Sprocket 31 is connected to the right angle shaft 29 and drives sprocket 35 by way of roller chain 33.

Sprocket 35 drives upper drive shaft 37. The upper spur gear 45 on the upper drive shaft 37 drives the lower spur gear 47 at a slower rate and in the opposite direction from the upper drive shaft 37. The lower drive shaft 43 drives the fixed lower roller 65 as shown in FIG. 2. The upper drive shaft 37 drives the upper roller 63 through yoke drive shaft 49, and slip yoke drive shaft 51.

The rollers are rotated at differing speeds, and in opposite directions. The rollers 63,65 function to pull the insulated wire 17 inward while the insulation is stripped from the wire. The cutting edges of the rollers 63,65 slice the insulation 19, and the pressure from the rollers 63,65 separates the insulation 19 from the metal core 21.

This method and apparatus have several distinct advantages over the prior art methods of stripping insulation from a wire.

First, the method and apparatus is a time saving device. For example, in one test, it was discovered that workers were able to manually strip the insulation from 500 pounds of copper wire in about 8 man hours. With this apparatus, 5,400 pounds of copper wire were stripped of insulation in the same amount of time. Clearly, a tenfold time advantage is obtained through the use of this apparatus.

Second, this method and apparatus is a labor saving device. The rollers serve to simultaneously propel the wire through the apparatus, cut the insulation, and separate the insulation from the wire. At the output of the apparatus, the wire emerges free from insulation, and the insulation falls to the ground separated from the wire. The manual stripping of wire is backbreaking work. The wire is heavy and difficult to manipulate, causing strain, exhaustion, and injury to workers.

While the invention has been described in only one of its forms, it should be apparent to those skilled in the art that it is not so limited, but is susceptible to various changes without departing from the scope of the invention.

I claim:

1. An apparatus for removing an insulating jacket from a wire of the type having a metal core, comprising:
   a rigid frame having two end plates;
   first and second rollers spaced apart from each other and axially mounted between the end plates of the frame, each roller having an outer surface containing a plurality of circumferential triangular grooves integrally formed on each roller, defining a circular cutting edge between each groove, wherein the circular cutting edges of the first roller are axially staggered relative to the circular cutting edges of the second roller;
   means for adjusting the distance between the second roller and the first roller to grasp the wire between the rollers and urge the cutting edges of the first and second rollers to penetrate the jacket; and
   means for axially rotating the first and second rollers at different speeds relative to each other and in opposing directions to propel the wire through the apparatus, slice the jacket, and remove the insulation from the metal core.

2. An apparatus according to claim 1 wherein the distance between the cutting edges of each roller increases along the length of the roller from one end plate to the other end plate.

3. An apparatus according to claim 1 wherein the distance between the cutting edges of each roller differs at selected sections of each roller from other sections in each roller.

4. An apparatus according to claim 1 wherein the groove width is less than the diameter of the wire adapted to be inserted between the rollers.

5. An apparatus according to claim 1 wherein the depth of the grooves of each roller differs at selected sections of each roller from other sections in each roller.

6. An apparatus for removing an insulating jacket from a wire of the type having a metal core, comprising:
   a rigid frame having two vertically mounted end plates;
   a lower cylindrical cutter blade having a plurality of triangular cutting edges integrally formed on said cutter blade and disposed about its outer circumference, mounted between the end plates and capable of rotating about its axis;
   an upper cylindrical cutter blade having a plurality of triangular cutting edges integrally formed on said cutter blade and disposed about its outer circumference, mounted between the end plates and capable of rotating about its axis, wherein the circular cutting edges of the upper cutter blade are axially staggered relative to the circular cutting edges of the lower cutter blade;
   means for adjusting the distance between the cutter blades to a stripping position for receiving the wire between the upper and lower cutter blades with one or more cutting edges penetrating the jacket of the wire;
   means for guiding the wire between the upper and lower cylindrical cutter blades and for preventing entry of objects between the cutter blades substantially larger in diameter than the width of the wire adapted to be inserted between the rollers;
   a motor mounted alongside the cutter blades;
   gear means mounted to the motor for rotating two spaced apart output shafts, with one output shaft at a faster speed than the other output shaft, one of the shafts being connected to one of the cutter blades and the other of the shafts being connected to the other of the cutter blades; and
   means in one of the shafts for allowing one end of said shaft to be raised and lowered relative to the other end of the shaft to allow one of the cutter blades to be moved toward and away from the other cutter blade while remaining coupled to the gear means.

7. An apparatus according to claim 6 wherein the means for guiding comprises a cover plate mounted to the rigid frame, having at least one aperture for the insertion of the wire.

8. An apparatus according to claim 6 wherein the means for guiding comprises a cover plate mounted to the rigid frame, having a plurality of apertures of varying dimension disposed along the cover plate from adjacent one end plate to adjacent the other end plate.

9. An apparatus according to claim 6 wherein the means of guiding comprises a cover plate mounted to the rigid frame, having a plurality of apertures of increasing diameter disposed along the cover plate between the end plates.

10. A method of removing an insulating jacket from a wire of the type having a metal core, comprising:

providing first and second rollers, each with an outer surface having a plurality of circumferential triangular grooves integrally formed thereon, defining cutting edges between each of the grooves, wherein the circular cutting edges of the first roller are axially staggered relative to the circular cutting edges of the second roller;

inserting the wire between the first and second rollers;

adjusting the distance between the rollers until the wire is firmly grasped by the rollers and at least one cutting edge penetrates the jacket; and rotating the first and second rollers at different speeds relative to each other and in opposing directions to advance the wire and cut the jacket free of the metal core.

11. The method according to claim 10 wherein one of the rollers is rotated faster than the other roller.

* * * * *